May 29, 1956     O. N. LAWRENCE     2,747,369
ENGINE TEMPERATURE RESPONSIVE MEANS TO CONTROL
FUEL SUPPLY BYPASS AND SPILL LINES
Filed Jan. 28, 1953
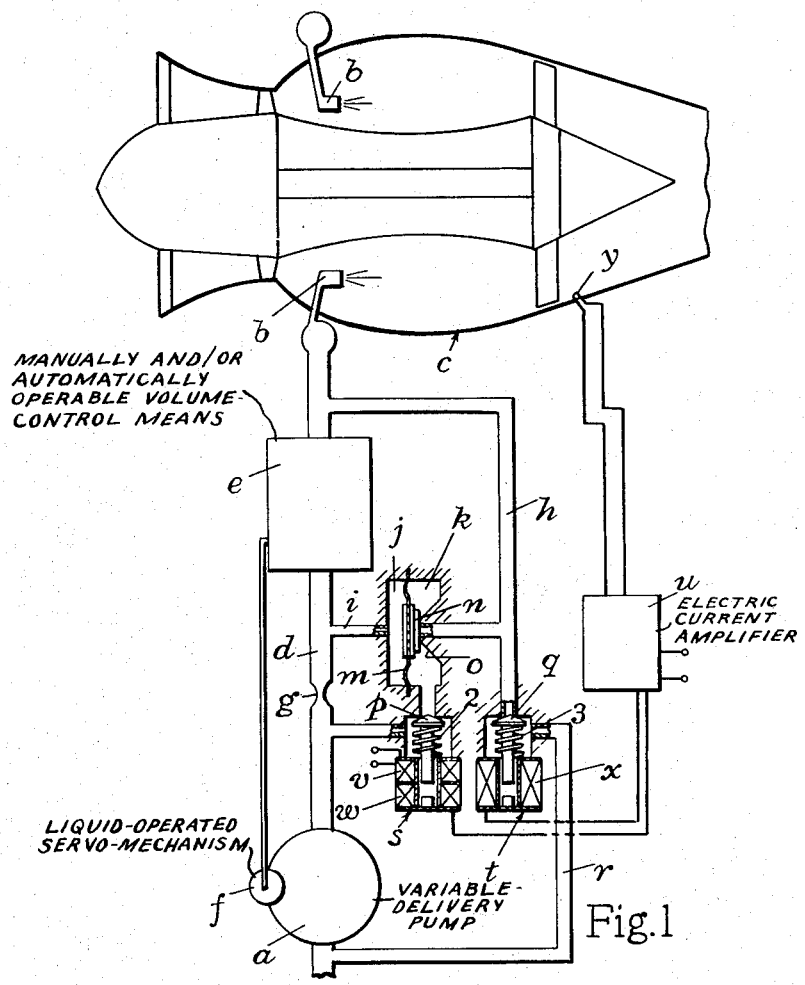
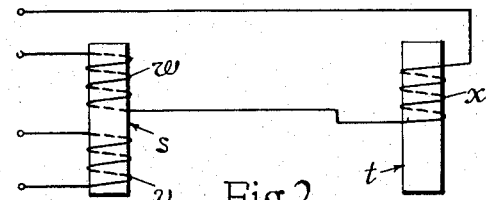
Fig.2
Inventor
O. N. Lawrence

United States Patent Office 2,747,369
Patented May 29, 1956

2,747,369

ENGINE TEMPERATURE RESPONSIVE MEANS TO CONTROL FUEL SUPPLY BYPASS AND SPILL LINES

Owen Napier Lawrence, Dorridge, England, assignor to Joseph Lucas (Industries) Limited, Birmingham, England Application January 28, 1953, Serial No. 333,634

Claims priority, application Great Britain February 13, 1952

2 Claims. (Cl. 60—39.28)

This invention relates to means for supplying liquid fuel to jet engines, gas turbines, or other like prime movers.

The invention comprises in combination a main path and a by-pass path through which fuel can be supplied from a pump to the burner or burners of the prime mover, the by-pass path being in parallel with a portion of the main path, a volume-control means in the main path, a means responsive to a pressure difference in the main path for controlling the flow in the by-pass path, a pair of valves in the by-pass path, and electromagnetic means responsive to a temperature associated with the prime mover for actuating the valves, one of these valves serving to close the by-pass path, and the other serving to divert fuel from the main path to a sump or the inlet side of the pump.

In the accompanying drawings:

Figure 1 is a part sectional view illustrating diagrammatically a system in accordance with the invention.

Figure 2 is a diagram showing the electromagnetic means employed in the system.

In carrying the invention into effect as shown in the drawings, there is employed any convenient variable-delivery pump $a$ for supplying the liquid fuel to the burner or burners $b$ of the prime mover $c$ along a passage forming a main path $d$. In the main path is included any manually and/or automatically operable volume-control means of known form $e$ acting on a liquid-operated servo-mechanism $f$ for controlling the rate of flow of fuel from the pump $a$ along this path. The pump $a$ and servo-mechanism $f$ are also of known form, and may be similar to those described in patent specification No. 2,403,371. The controlling means $e$, when automatically operable, is responsive to such factors as the speed of the prime mover, atmospheric pressure, and/or the pressure of the air supplied by a blower, and may be similar to that described in patent specification No. 2,567,500. Both the controlling means $e$ and the liquid-operated servo-mechanism $f$ are of known form, and do not require further description. In the part of the main path $d$ between the pump $a$ and the controlling means $e$ is included a restriction $g$ for setting up a pressure difference in the liquid flowing in this part of the path, and the anterior side of the restriction and the exit side of the controlling means are interconnected by a passage forming the by-pass path $h$.

At a point in the main path $d$ between the said restriction $g$ and the controlling means $e$ is connected a passage $i$ leading to one of two compartments $j$, $k$ into which a chamber is divided by a flexible diaphragm $m$ the other compartment $k$ forming a part of the by-pass path $h$. On the diaphragm $m$ is carried a closure member $n$ which by cooperation with a seat $o$ in the by-pass path $h$ can control the flow in this path. When the system is at rest the closure member $n$ closes or restricts the by-pass path $h$ at the seat $o$, but when flow commences in the main path $d$ this by-pass path is opened by the closure member in response to the pressure-difference between the entrance and exit sides of the restriction $g$.

In the by-pass path $h$ are included two normally closed valves $p$, $q$. The valve $p$ is situated between the entrance to the by-pass path and the seat $o$ controlled by the closure member $n$ above mentioned. The other valve $q$ controls the entrance to a spill path formed by a passage $r$ leading from the by-pass path $h$ to a sump or the inlet side of the pump $a$. These valves $p$, $q$ are respectively connected to a pair of electromagnets $s$, $t$, and are operable thereby under the control of any convenient electric current amplifier $u$ which is connected to a thermo-couple $y$ in the prime mover $c$ so that the amplifier is responsive to the electric current produced by the thermocouple, and thus to the temperature of the motive fluid in the part of the prime mover containing the thermocouple. The electromagnet $s$ for operating the valve $p$ is provided with a pair of opposed windings $v$, $w$, and the electromagnet $t$ for operating the other valve $q$ is provided with a single winding $x$. Also the winding $w$ of the electromagnet $s$ is connected in series with the winding $x$ of the electromagnet $t$, and current is supplied to these windings under the control of the amplifier $u$ which in turn is controlled by a thermocouple $y$.

When the system above described is brought into operation, current from any convenient source flows through the winding $v$ of the electromagnet $s$, and causes the valve $p$ to be opened, so allowing fuel to flow through the by-pass path $h$ until a predetermined temperature is reached in the vicinity of the thermocouple $y$. At this temperature the current in the winding $w$ neutralizes the action of the current in the winding $v$, so allowing the valve $p$ to close under the action of a spring 2. At a higher temperature in the vicinity of the thermocouple $y$ an increased current flows through the winding $w$ and the winding $x$ of the other electromagnet $t$, and this causes the other valve $q$ to open against the action of a spring 3, permitting valve $n$ to close and allowing fuel from the main path $d$ to be diverted through the by-pass path $h$ and the passage $r$ to the sump or pump inlet.

The arrangement is such that when the system is operating under normal working conditions, the fuel flowing along the main path $d$ is subject to the control of the controlling means $e$ in the main path. Also the flow in this path is supplemented by fuel flowing along the by-pass path $h$, the rate of flow in the latter path being dependent on the pressure difference across the restriction $g$ above mentioned. When the temperature in the vicinity of the thermocouple $y$ exceeds a predetermined amount the valve $p$ in the by-pass path $h$ closes, causing a diminution of the total fuel supplied to the engine. Should the temperature continue to increase, then at a predetermined higher temperature the valve $q$ opens, causing fuel to be diverted from the main path $d$. Alternatively, in some cases, it may be arranged for both valves $p$, $q$ to be actuated simultaneously, that is to say one to close and the other to open simultaneously.

By this invention the control of the rate of supply of fuel to the prime mover can be closely regulated in a convenient manner.

Having thus described my invention what I claim as new and desire to secure by Letters Patent is:

1. A system for supplying liquid fuel to a jet engine, gas turbine, or like prime mover, comprising in combination with a fuel pump, a main path and a by-pass path through which fuel can be supplied from the pump to the prime mover, the by-pass path being in parallel with a portion of the main path, a volume-control means in the main path, means for establishing a pressure difference in the main path, a means responsive to the said pressure difference for controlling the flow in the by-pass path, a pair of valves in the by-pass path, a spill path for fuel from the main path, and electromagnetic means responsive to a temperature of the motive fluid in the prime mover for opening the valves with increase of the said temperature, one of the valves being located in and serving to close the by-pass path, and the other of the valves being located between the main path and the spill path and serving, when open, to permit fuel flow from the main path to the spill path.

2. A system as claimed in claim 1, in which the electromagnetic means comprise in combination an electromagnet having a pair of opposed windings, and a second electromagnet having a single winding connected in series with one of the said opposed windings, the first mentioned electromagnet being connected to and serving to control the valve for closing the by-pass path, and the second electromagnet being connected to and serving to control the other valve.

References Cited in the file of this patent
UNITED STATES PATENTS

| | | |
|---|---|---|
| 2,440,566 | Armstrong | Apr. 27, 1948 |
| 2,590,853 | Fulton | Apr. 1, 1952 |
| 2,594,689 | Sharp | Apr. 29, 1952 |
| 2,610,466 | Ballantyne | Sept. 16, 1952 |